(12) United States Patent
Nakagawa et al.

(10) Patent No.: US 9,272,361 B2
(45) Date of Patent: Mar. 1, 2016

(54) METHOD FOR JOINING METAL MATERIALS

(71) Applicant: Nissan Motor Co., Ltd., Kanagawa (JP)

(72) Inventors: Shigeyuki Nakagawa, Kanagawa (JP); Kenji Miyamoto, Kanagawa (JP); Toshikazu Nanbu, Kanagawa (JP)

(73) Assignee: Nissan Motor Co., Ltd., Kanagawa (JP)

( * ) Notice: Subject to any disclaimer, the term of this patent is extended or adjusted under 35 U.S.C. 154(b) by 0 days.

(21) Appl. No.: 14/378,441

(22) PCT Filed: Feb. 25, 2013

(86) PCT No.: PCT/JP2013/054673
§ 371 (c)(1),
(2) Date: Aug. 13, 2014

(87) PCT Pub. No.: WO2013/129281
PCT Pub. Date: Sep. 6, 2013

(65) Prior Publication Data
US 2015/0001280 A1    Jan. 1, 2015

(30) Foreign Application Priority Data
Feb. 28, 2012    (JP) ................................. 2012-041357

(51) Int. Cl.
*B23K 31/02*    (2006.01)
*B23K 20/02*    (2006.01)
(Continued)

(52) U.S. Cl.
CPC ............. *B23K 20/026* (2013.01); *B23K 20/021* (2013.01); *B23K 20/16* (2013.01); *B23K 20/233* (2013.01); *B23K 35/282* (2013.01); *B23K 2201/36* (2013.01); *B23K 2203/10* (2013.01); *B23K 2203/12* (2013.01); *B23K 2203/18* (2013.01)

(58) Field of Classification Search
CPC ...... B23K 11/20; B23K 20/16; B23K 35/282; C22C 18/04; C22C 18/00
See application file for complete search history.

(56) References Cited

U.S. PATENT DOCUMENTS

| 7,323,068 | B2 * | 1/2008 | Benedictus et al. | .......... 148/417 |
| 2011/0159313 | A1 * | 6/2011 | Kasukawa et al. | ............. 428/649 |
| 2011/0303736 | A1 | 12/2011 | Sigler et al. | |

FOREIGN PATENT DOCUMENTS

| JP | 56-62685 A | 5/1981 |
| JP | 56-128688 A | 10/1981 |

(Continued)

OTHER PUBLICATIONS

Computer english translation of JP2011124015A.*

(Continued)

*Primary Examiner* — Erin Saad
(74) *Attorney, Agent, or Firm* — Osha Liang LLP

(57) ABSTRACT

A method for joining metal materials, which joins a first member with at least a joining face made of Metal A, the Metal A being mainly composed of at least one selected from the group consisting of Al, Cu, Ag and Au, to a second member with at least a joining face made of Metal B, the Metal B being mainly composed of at least one selected from the group consisting of Al Cu, Ag and Au, includes interposing an insert between the joining faces of the first and second members, wherein the insert contains Zn as a metal capable of causing an eutectic reaction with at least one metal except for Au in Metal A as well as at least one metal except for Au in Metal B.

20 Claims, 4 Drawing Sheets

(51) Int. Cl.
    *B23K 20/16* (2006.01)
    *B23K 20/233* (2006.01)
    *B23K 35/28* (2006.01)

(56) References Cited

FOREIGN PATENT DOCUMENTS

| JP | S6024286 A | 2/1985 |
| JP | H3-66072 B2 | 10/1991 |
| JP | 7-169875 | 7/1995 |
| JP | 2006-198679 A | 8/2006 |
| JP | 2011-124015 A | 6/2011 |
| WO | WO 2010026892 A1 * | 3/2010 |

OTHER PUBLICATIONS

International Search Report for corresponding International Application No. PCT/JP2013/054673, mailed May 21, 2013 (6 pages).

* cited by examiner

METHOD FOR JOINING METAL MATERIALS

BACKGROUND

1. Technical Field

The present invention relates to a method for joining metal materials at least one of which has an oxide film on the surface, in more detail to a low-cost method for joining the metal materials that can be performed in the air at low temperature and can minimize the influence of heat on the base materials and surroundings.

2. Related Art

Various metal materials are used in industrial products, and such metal materials are joined by various types of joining methods including joining between heterogeneous metal materials as well as joining between homogeneous materials. For example, copper- or aluminum-based metals, which have low electrical resistance, are used for parts of various batteries and electric/electronic devices. In these parts, such metal materials would be joined to each other. Further, for the purpose of reducing contact resistance, gold- or silver-plated parts would also be joined.

Metal materials as described above used in such parts can be joined by brazing with a solder. However, the resulting parts cannot be used at a temperature higher than the melting point of the solder (brazing material) (e.g. around 200° C.). Further, even though it is possible to improve the use temperature of parts by using a high-temperature solder, solders containing a noble metal increases the cost. Further, although it is depending on the composition of a solder, intermetallic compounds or a Kirkendall void may be formed in a high temperature condition, which impairs the strength and the durability. For these reasons, it is desirable that metal materials as described above are directly joined to each other without using a brazing material.

On the other hand, the above-described metals except for gold typically have an oxide film on the surface. Such oxide films block direct joining, and thereby make metallurgical joining difficult.

For example, Patent Document 1 describes a method of joining aluminum to aluminum or aluminum to alumina, including: interposing an insert containing an element that causes eutectic reaction with the base material between faces to be joined, making them in contact with each other in an oxygen atmosphere, and then heating the faces to be joined to a temperature in the range that effects the eutectic reaction, so that a melt phase on the contact face due to the eutectic reaction as well as an oxide phase due to a reaction between the components of the base material and oxygen present at the gap of the contact faces are produced (see claim 1). As a result, it is described that the oxide films on the surfaces of the base material are broken and mixed in the melt phase along with the oxide produced by a reaction between the components of the melt phase and oxygen (see the middle part of the left column on page 3).

CITATION LIST

Patent Literature

Patent Document 1: Japanese Patent Examined Publication No. Hei3-66072

SUMMARY OF INVENTION

However, in the method described in Patent Document 1, copper, silver, silicon, an aluminum-silver hypereutectic alloy, an aluminum-copper hypereutectic alloy or an aluminum-silicon hypereutectic alloy is used for the insert (see claim 3). Accordingly, the eutectic temperatures between such inserts and aluminum are all higher than 500° C. (for example, 548° C. in Al—Cu series, and 577° C. in Al—Si series), which means a high joining temperature is required. Especially in heat-treated alloys such as 6000 series, the joining temperature is higher than their own solution heat treatment temperatures, which results in problematic decrease in strength of the base material due to softening.

Further, another problem is that the joining in an oxygen atmosphere requires a special chamber, which results in increased cost for the facilities.

One or more embodiments of the present invention provide a method for joining metal materials which can directly join the metal materials at least either one of which has an oxide film on the surface to each other, and can be performed in the air, at low temperature, under low pressure and at low cost.

One or more embodiments of the present invention interposes an insert between members to be joined, which contains a metal capable of causing an eutectic reaction with a metal of both members to be joined, when a pressure and a heat are applied to cause the eutectic reaction. The present invention was thus completed.

That is, the present invention is based on the above-described finding, and a joining method for metal materials of the present invention, which joins a first member with at least a joining face made of Metal A, the Metal A being mainly composed of at least one selected from the group consisting of Al, Cu, Ag and Au, to a second member with at least a joining face made of Metal B, the Metal B being mainly composed of at least one selected from the group consisting of Al, Cu, Ag and Au, (except for joining metals both of which are mainly composed of Al and joining metals both of which are mainly composed of Au), includes: interposing an insert between the joining faces of the first and second members, wherein the insert contains Zn, which is a metal capable of causing an eutectic reaction with at least one metal except for Au in Metal A as well as at least one metal except for Au in Metal B; and joining the first and second members to each other by heating the first and second members to a temperature causing the eutectic reaction within a range from a melting point of the insert to the melting point+100° C. while applying an opposing pressure to the first and second members, so that an eutectic melt is produced at an joining interface between the first and second members, and an oxide film on a surface of the Metal A and/or Metal B is discharged from the joining interface along with the eutectic melt.

According to the present invention, the eutectic reaction between at least one of Al, Cu and Ag in Metal A with Zn in the insert breaks the oxide film of Metal A, and the eutectic reaction between at least one of Al, Cu and Ag in Metal B with Zn in the insert breaks the oxide film of Metal B. Then, the broken oxide films are discharged from the joining interface along with the eutectic melt. Therefore, it is possible to directly join Metal A to Metal B in the conditions of low temperature and low pressure (low beat input and low distortion) at low cost.

DETAILED DESCRIPTION

Figure 1:
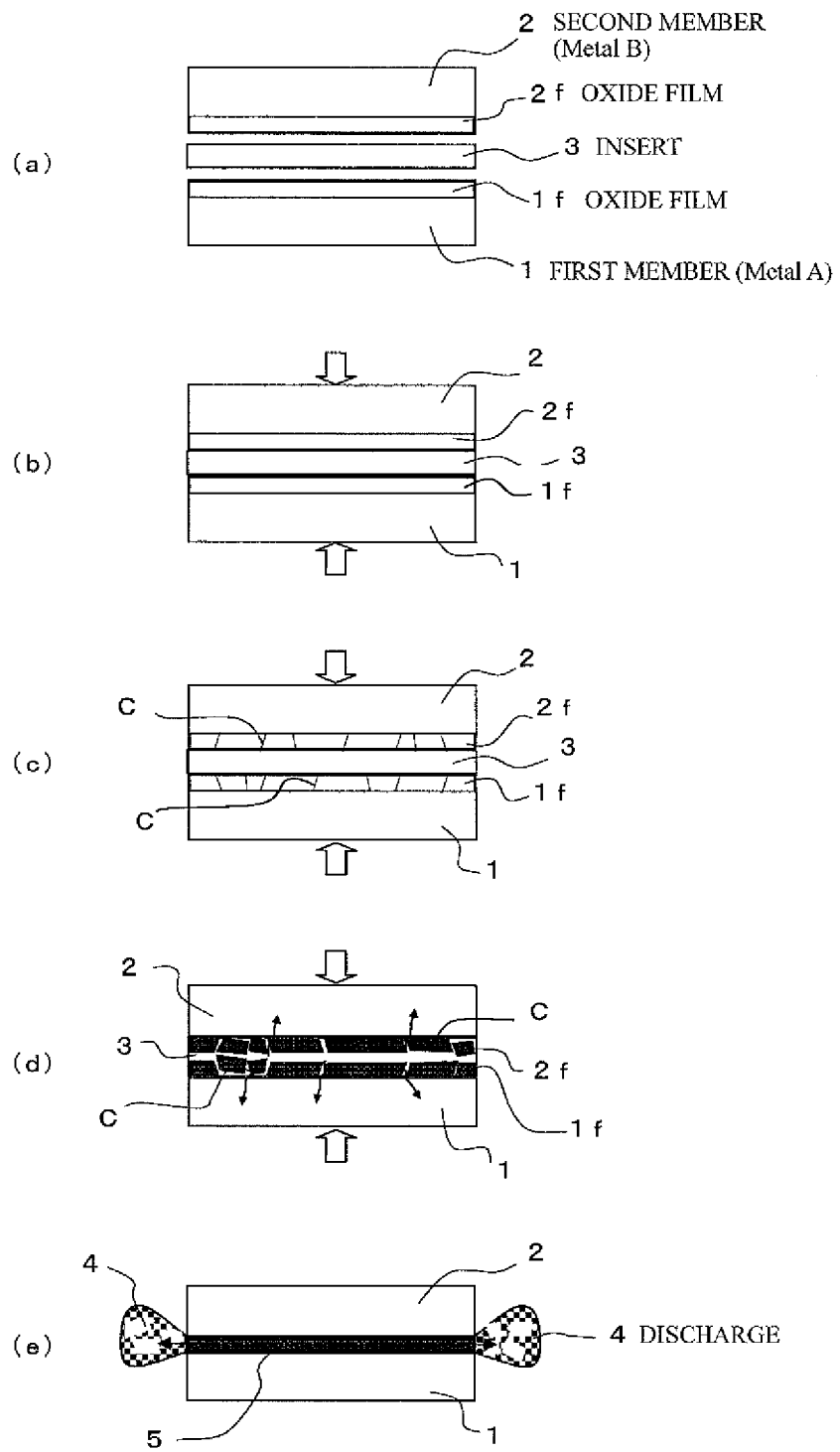
FIGS. 1(a) through 1(e) are cross sectional views schematically illustrating an example of the joining process according to the method for joining metal materials of the present invention.

Hereinafter, embodiments of the present invention will be specifically described in more detail. As used herein, the symbol "%" means percent by mass unless otherwise noted. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

In the method for joining metal materials of the present invention, when a first member with at least a joining face made of Metal A, which is mainly composed of at least one selected from the group consisting of Al, Cu, Ag and Au, is joined to a second member with at least a joining face made of Metal B, which is mainly composed of at least one selected from the group consisting of Al, Cu, Ag and Au, (except for joining metals both of which are mainly composed of Al and joining metals both of which are mainly composed of Au), an insert containing Zn, which is a metal capable of causing an eutectic reaction with at least one metal except for Au in Metal A as well as at least one metal except for Au in Metal B, is interposed between the joining faces of the members as described above. Subsequently, both members are heated to a temperature causing the eutectic reaction within a range from a melting point of the insert to the melting point+100° C. while applying an opposing pressure to the members. Then, the eutectic reaction produce a melt at the joining interface between the members, and an oxide film on the surface of Metal A and/or Metal B is discharged along with the melt. The members are thus joined to each other.

Eutectic melting occurs when two or more metals interediffuse to form an interdiffusion zone having the eutectic composition. If the temperature is held at or higher than the eutectic temperature in this condition, a melt phase is produced by the eutectic reaction. In the case of Zn—Al alloys, for example, while the melting point of Al is 660° C. and the melting point of Zn is 419.5° C., the eutectic metal of Zn—Al alloys melts at 382° C., which is lower than these melting points. Accordingly, if clean surfaces of these metals are brought into contact with each other while the temperature is maintained at or higher than 382° C., a reaction (eutectic reaction) is caused. While the eutectic composition is Al-95% Zn, the eutectic reaction itself is a specific change irrelevant to alloy compositions. That is, the composition of the insert only affects the amount of eutectic reaction.

On the other hand, typical metal materials except for Au have an oxide film on the surface. However, the application of a pressure in the joining step causes plastic deformation of the material surface, which causes physical local breakage of the oxide film.

That is, since microscopic projections on the material surfaces grazes each other by the application of a pressure, the base material comes in contact with the insert as a result of local breakage of a part of the oxide film, and the eutectic melting between the metal components of the base material and the insert occurs from the contacted portion.

Then, the produced melt phase breaks down the nearby oxide film, and the eutectic melting thus spreads over the whole surfaces. In this way, the breakage of the oxide film extends and proceeds, and the oxide films on the joining faces are removed at a low temperature (the eutectic temperature). The members are thus directly joined to each other without intervention of any brazing material. Since the eutectic composition is spontaneously achieved by the interdiffusion, it is not required to control the compositions. The only required condition is that an eutectic reaction at a low temperature occurs between the metals of the base material and the insert.

It is required that both of a metal in Metal A and a metal in Metal B cause an eutectic reaction with Zn at the joining faces. Accordingly, the term "temperature causing the eutectic reaction" refers to a higher one of the two eutectic temperatures.

If at least the joining face of one of the members to be joined is made of a metal mainly composed of Au, the metal does not cause an eutectic reaction with Zn. However, since no oxide film is formed on the joining face, it is not even required to cause an eutectic reaction for removing an oxide film.

FIGS. 1(a) through 1(e) are step-by-step process views illustrating a joining process of metal materials according to the present invention.

First, a first member 1 with at least a joining face made of Metal A, which is mainly composed of one selected from the group consisting of Al, Cu, Ag and Au, and a second member 2 with at least a joining face made of Metal B, which is mainly composed of one selected from the group consisting of Al, Cu, Ag and Au, are prepared. However, joining between metals both of which are mainly composed of Al and joining between metals both of which are mainly composed of Au are excluded.

The first and second members may be entirely made of the above-described Metal A and Metal B respectively, or may be made of a different metal in which a layer of Metal A or Metal B is formed at least at a joining face by plating, sputtering, thermal spraying or the like. The surfaces of Metal A and Metal B have oxide films 1f and 2f respectively. If either Metal A or Metal B is mainly composed of Au, such metals do not have an oxide film.

Metal A and Metal B may be combined in a variety of combinations of pure metals and alloys except for combinations of two aluminum-based materials or of two gold-based materials. However, homogenous materials can form a joining with higher endurance reliability because there is no origin of degradation reaction at the interface. As used herein, the term "homogenous materials" means that they have the same metal structure or fall into the same series, and does not means that they always have an identical compositional ratio of alloy components.

Then, as illustrated in FIG. 1(a), an insert 3 is placed between the members 1 and 2.

The insert 3 is made of a material that contains Zn, which is a metal element capable of causing an eutectic reaction with at least one of metal elements except for Au in Metal A, i.e. at least one of Al, Cu and Ag, as well as at least one of those metal elements in Metal B. For example, the insert 3 is made of a metal mainly composed of Zn (pure zinc or a zinc alloy).

Alternatively, the insert may be made of an alloy mainly composed of Zn and at least one metal selected from the group consisting of Al, Mg, Cu Ag and Sn, for example, an alloy containing Zn and Al or an alloy containing Zn, Al and Mg. That is, since such alloys containing Zn and Al have low eutectic temperature (382° C. in Zn—Al alloys and 330° C. in Zn—Al—Mg alloys), it is possible to remove the oxide films that block the joining from the joining interface at such low temperatures so as to join the members without causing any softening or deformation of the base material.

Further, it is desirable that the insert 3 contains the same component as that of either or both of Metal A and Metal B in order to improve the reactivity of the insert with the members to be joined and to improve the affinity of the joining interface.

The thickness of the insert 3 is desirably from 20 μm to 200 μm. If the thickness of the insert 3 is less than 20 μm, discharge of the oxide films may become insufficient, or sealing of the joining portion may deteriorate, which may cause oxidation during the joining process and thereby decrease the strength of the joining portion. In contrast, if the thickness is greater than 200 μm, a higher pressure may be required to discharge an excessive portion, or a larger amount of residues may be left in the interface, which may degrade the properties of the joined portion.

In the above-described embodiment, the plate insert 3 is simply sandwiched between the members 1 and 2. However, the shape of the insert 3 and the method of interposing it between the members may be different. For example, either or both of the joining faces of the members may be coated by the insert in advance by plating or powder deposition. It is desirable that a foil insert is sandwiched between the members for the sake of high flexibility in composition and shape (thickness).

As used herein, the term "mainly composed of" for describing Metal A, Metal B or the insert means that the total content of a certain metal in these materials is equal to or greater than 80%.

Next, as illustrated in FIG. 1(b), a pressure is applied on both of the first and second members 1 and 2 so that the members come in close contact with each other via the insert 3, and the members are subsequently heated while applying the pressure. Then, the applied pressure deforms the members 1 and 2 so as to form cracks C in the oxide films 1f and 2f of the members 1 and 2 as illustrated in FIG. 1(c).

When the temperature reaches the eutectic temperature range in this condition, Metal A and Metal B beneath the oxide films 1f and 2f firstly react with Zn of the insert 3 to cause an eutectic reaction so that an eutectic melt phase are produced. Then, as illustrated in FIG. 1(d), this liquid phase penetrates into the base material through the cracks C of the oxide films 1f and 2f. As a result, the area of the eutectic melt expands, and the oxide films 1f and 2f are broken into fragments and dispersed in the liquid phase.

The continuing application of the pressure discharges excessive eutectic melt from the joining interface as illustrated in FIG. 1(e). In this step, the fragments of the oxide films 1f and 2f, which is dispersed in the liquid phase, are simultaneously pushed out of the joining interface along with the eutectic melt as a discharge 4. In this way, the members 1 and 2 are joined to each other via a layer of a mixture derived from the insert 3, i.e. a mixture 5 that contains Zn, a Zn—Al alloy and the like in this embodiment.

Depending on the joining conditions, the mixture may be completely discharged so that the members 1 and 2 are directly joined to each other, or a mixture of a directly joined portion with a portion interposed with the mixture layer 5 may be formed. Further, diffusion of Zn may be observed in the vicinity of the joining face.

In the case of butt joining, the discharge 4 from the joining interface, which contains the eutectic melt and the oxide film fragments, is pushed out of the joining interface, and it can be completely removed from the resulting joint. In contrast, in the case of lap joining or spot joining, the discharge 4 is pushed out of the joining portion and is left in the surrounding part to serve as a sealer. This contributes to improve the sealing of the joining portion.

While the joining method of the present invention can be performed in an inert gas atmosphere, it can also be performed in the air without any difficulty. The joining method may also be performed in vacuum, but joining in the air is advantageous also in terms of cost since not only joining in vacuum requires vacuum equipment but also the melted insert may damage a vacuum meter or a gate valve.

In the joining method of the present invention, means for heating the joining portion to maintain the temperature within the above-described temperature range is not particularly limited, and may be, for example, resistance heating, high-frequency heating, infrared heating or a combination thereof. With regard to the joining temperature, if it is too high, the liquid phase is excessively produced because the base material is melted into the liquid phase. The excessive liquid phase is likely to be left in the joining interface, which causes a decrease of the strength. Specifically, the joining temperature is preferably within the range from the melting temperature of the insert to the melting temperature+100° C.

The rate of temperature increase to the joining temperature is desirably rapid, because if it is slow, oxidation of the interface may make it difficult to discharge the melt, which may cause a decrease of the strength. This is likely to occur especially when the joining is performed in the air. Specifically, the rate is desirably equal to or greater than 3° C./sec, more desirably equal to or greater than 10° C./sec, and yet more desirably equal to or greater than 25° C./sec.

The applied pressure in the joining method of the present invention is desirably from 5 MPa to less than 30 MPa. If the applied pressure is less than 5 MPa, the eutectic melt and the oxide films may not be sufficiently discharged from the joining interface. In contrast, if the applied pressure is 30 MPa or more, the members to be joined may be deformed.

In the joining method of the present invention, it is desirable that a fine uneven structure is formed on at least a part of the portions to be joined, i.e. the joining faces and the surface of the insert. This structure causes stress concentration, and thereby makes it easy to break the oxide films (to form cracks). Accordingly, a uniform joint can be formed while reducing the applied pressure and resultant load required to break the oxide films.

FIGS. 2(a) to 2(e) are step-by-step process views illustrating a joining process in which a fine uneven structure is formed on one of the members to be joined.

In this embodiment, as illustrated in FIG. 2(a), a fine uneven structure 1r is previously formed on the joining face of a first member 1 (Metal A), and an insert 3 is placed between this first member 1 and a second member 2 (Metal B). Metal A and Metal B have oxide films 1f and 2f respectively on the surfaces.

The fine uneven structure 1r on the joining face of the first member 1 may have any shape or any number as long as it has a function of promoting breakage of the oxide films by stress concentration. For example, the structures as illustrated in FIGS. 3(a) to 3(c) may be employed.

Figure 3:
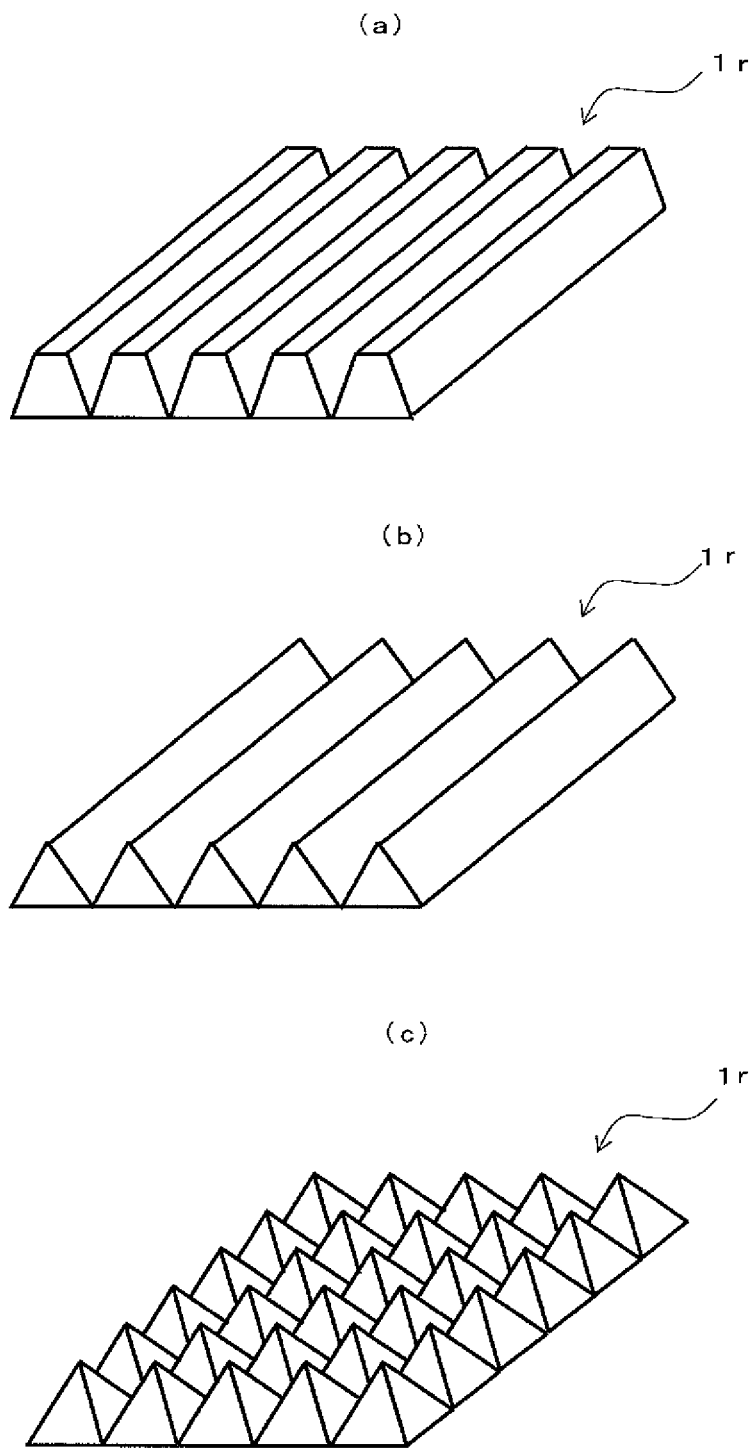
FIGS. 3(a) to 3(c) are perspective views schematically illustrating examples of a fine uneven structure that is formed on a joining face in the present invention.

That is, if the uneven structure has a trapezoidal cross section and has projections with flat tips as illustrated in FIG. 3(a), a stress concentrating means is easily formed although the stress concentration is somewhat decreased, which can reduce the machining cost.

Further, the uneven structure as illustrated in FIG. 3(b), which is like triangular columns arranged in parallel, may also be employed. Since this uneven structure has projections with linear tips, it can enhance stress concentration and thereby has improved performance of breaking the oxide films.

Further, the uneven structure as illustrated in FIG. 3(c), which is square pyramids arranged in a matrix, may also be employed. Since this uneven structure has projections with point tips, it can enhance stress concentration and thereby has improved performance of breaking the oxide film.

As described above, the fine uneven structure 1r may have any shape as long as it has a function of promoting breakage of the oxide films by stress concentration. In addition to the above-described structures, it may have projections with curved tips, such as corrugated shape, lenticular shape and semispherical shape. It should be understood that as such curvatures have smaller curvature radius, they cause more significant stress concentration, which makes it easier to break the oxide films.

The fine uneven structure 1r as described above can be formed by, for example, cutting, grinding, plastic forming (roller burnishing), laser machining, electric discharge machining, etching, lithography or the like, and the method is not particularly limited. Among these machining methods, plastic forming can be performed at very low cost.

With regard to dimension and shape, the fine uneven structure has an aspect ratio (height/width) of 0.001 or more and a pitch of 1 μm or more, desirably an aspect ratio of approximately 0.1 or more and a pitch of approximately 10 μm or more.

In the condition as illustrated in FIG. 2(a), an opposing pressure is applied to the first and second members 1 and 2 so that they come in close contact with each other via the insert 3, and the members are subsequently heated while applying the pressure.

Then, as illustrated in FIG. 2(b), the stress increases locally and drastically at the part in contact with the protrusion tips of the fine uneven structures 1r. As a result, the oxide film 2f of the second member 2 is broken, and cracks C are formed without requiring large increase of the applied pressure. In this embodiment, since the fine uneven structure 1r is formed, the pressure applied in the joining step can be reduced. The applied pressure is desirably from 1 MPa to 30 MPa.

In this condition, when the temperature of the joining faces reaches the melting point of the insert 3, the melted insert 3 penetrates into the cracks C to cause an eutectic reaction with a metal element in Metal B of the second member 2 to produce an eutectic melt phase.

Then, the area of the eutectic melt spreads over the whole joining surfaces. In this way, the oxide films 1f and 2f of the first and second members 1 and 2 are removed from the surfaces, and as illustrated in FIG. 2(c), fragments of the oxide films 1f and 2f are dispersed in the eutectic melt.

As illustrated in FIG. 2(d), when the continuing pressure discharges the eutectic melt from the joining interface, most of the fragments of the oxide films 1f and 2f, which is dispersed in this liquid phase, are also pushed out of the joining interface along with the eutectic melt. As a result, fresh faces of Metal A and Metal B are exposed, and interdiffusion occurs at the joining interface.

In this way, as illustrated in FIG. 2(e), the first and second members 1 and 2 are directly joined to each other. In this process, a trace amount of mixture that contains an eutectic product, the oxide films, a metal from the insert and the like may be left at the joining interface. However, the amount thereof can be reduced to the minimum by adjusting the joining conditions. As long as the first and second members 1 and 2 are directly joined to each other, there is no problem with the strength.

Figure 2:
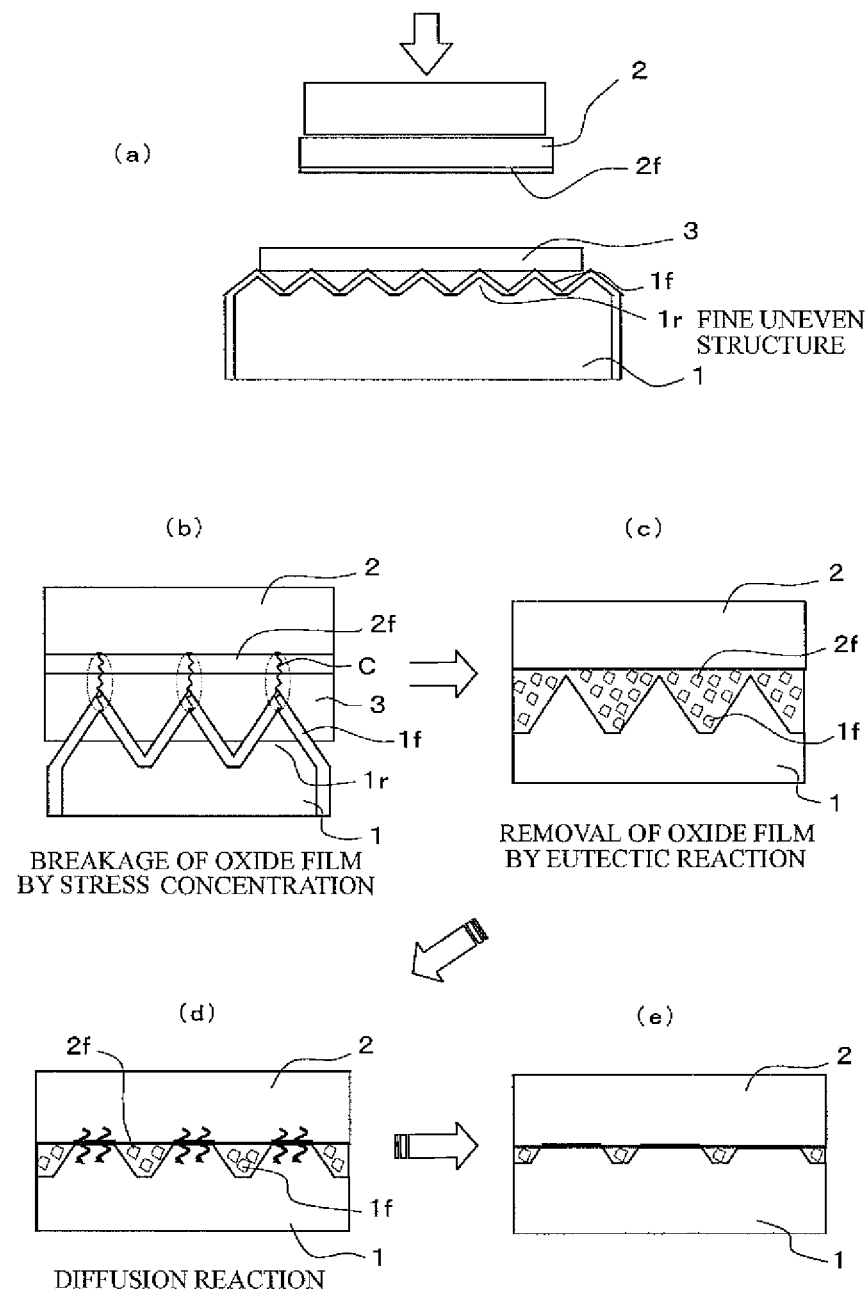
FIG. 2(a) through 2(e) are cross sectional views schematically illustrating another example of the joining process according to the method for joining metal materials of the present invention.

In FIG. 2, the fine uneven structure 1r is formed on the first member 1. However, the present invention is not limited thereto, and it is only required that the fine uneven structure is formed at least one of the portions to be joined. It may be formed on the joining face of either one of the first and second members as described above, or may also be provided on both joining faces. By forming it on both joining faces, the number of origins of the oxide film breakage can be increased.

Further, the fine uneven structure may also be formed on either or both faces of the insert 3. Since this eliminates the need for a step of forming a fine uneven structure on the first or second member, the joining can be performed at low cost.

EXAMPLES

Hereinafter, the present invention will be specifically described based on examples.

As the first member, round rods of pure copper (Metal A) of 5 mm diameter and 15 mm long and similar round rods of pure copper with 3 μm thick silver plating (Metal A) or gold plating (Metal A) on an end face were used. As the second member, round rods of aluminum alloy (A6061) (Metal B) of 10 mm diameter and 25 mm long, round rods of oxygen free copper (Metal B) of the same size, and similar round rods of oxygen free copper with 3 μm thick silver plating (Metal B) on an end face were used.

Some end faces to be joined were mirror-finished by a lathe, and have a surface roughness Ra of 0.01 μm. The other end faces had a fine uneven structure of periodic V grooves having a height of 100 μm, an aspect ratio of 1.0 and a pitch of 100 μm (see FIG. 3(b)), which is formed on the second member.

As the insert, Zn—Al alloy foils (10.8% Al-89.2% Zn, melting point of 385° C.), Zn—Al—Mg alloy foils (4.1% Al-2.5% Mg-93.4% Zn, melting point of 352° C.), Zn—Al—Ag alloy foils (3.28% Ag-4.19% Al-92.53% Zn, melting point of 389° C.), each of which has a diameter of 8 mm and a thickness of 100 μm, and Zn—Al—Cu alloy foils (4.0% Al-2.0% Cu-94.0% Zn, melting point of 389° C.) having a diameter of 8 mm and a thickness of 20 μm, 100 μm or 300 μm were prepared. These alloy foils were prepared by laminating approximately 20 μm thick quenched foils to the required thicknesses, which are produced by spraying molten alloy of the above compositions to a metal roller rotating at high speed.

The joining was performed by placing an insert of the above composition and size between the end faces to be joined of round rods, and while applying a pressure of from 2 to 25 MPa, heating them up to 400° C. to 420° C. in the air by an high-frequency heating coil surrounding the joining portion such that the temperature was raised to a required joining temperature and was then maintained for 1 minute. The rate of temperature increase in this step was 10° C./sec. The joining temperature was measured by a type R thermocouple T that is welded on the side face of a round rod near the end face to be joined.

The joining strength of obtained butt joints was evaluated by a tensile test using a universal tester. The testing speed was 1 mm/min.

As a typical conventional Sn—Ag—Cu solder is considered to have a joining strength of 30 MPa at the lowest, examples having a strength greater than this level were evaluated as "A", those having a strength greater than 20 MPa to less than 30 MPa were evaluated as "B", and those having a strength less than 20 MPa were evaluated as "C". The results were shown in table 1 along with the joining conditions.

Example 1

A butt joint of Example 1 was obtained by interposing a 100 μm thick Zn—Al alloy foil as an insert between a first member (Metal A) of pure copper and a second member (Metal B) of aluminum alloy with the fine uneven structure, and joining them under an applied pressure of 10 MPa at 420° C. for 1 minute.

Example 2

A butt joint of Example 2 was obtained by repeating the same process as Example 1 except that the insert was changed from a Zn—Al alloy foil to a Zn—Al—Cu alloy foil, and the pressure applied in the joining step was changed to 2 MPa.

Example 3

A butt joint of Example 3 was obtained by repeating the same process as Example 2 except that the pressure applied in the joining step was changed to 20 MPa.

Example 4

A butt joint of Example 4 was obtained by repeating the same process as Example 2 except that the second member (Metal B) did not have the fine uneven structure but had a mirror-finished joining face, and the pressure applied in the joining step was changed to 25 MPa.

Example 5

A butt joint of Example 5 was obtained by repeating the same process as Example 2 except that the thickness of the insert was changed to 300 μm, and the pressure applied in the joining step was changed to 10 MPa.

Example 6

A butt joint of Example 6 was obtained by repeating the same process as Example 5 except that the thickness of the insert was changed from 300 μm to 20 μm.

Example 7

A butt joint of Example 7 was obtained by repeating the same process as Example 1 except that a round rod of pure copper with a silver-plated end face was used as the first member (Metal A).

Example 8

A butt joint of Example 8 was obtained by repeating the same process as Example 7 except that the insert was changed from a Zn—Al alloy foil to a Zn—Al—Ag alloy foil.

Example 9

A butt joint of Example 9 was obtained by repeating the same process as Example 1 except that a round rod of pure copper with a gold-plated end face was used as the first member (Metal A).

Example 10

A butt joint of Example 10 was obtained by repeating the same process as Example 9 except that the insert was changed from a Zn—Al alloy foil to a Zn—Al—Mg alloy foil, and the joining temperature was changed to 400° C.

Example 11

A butt joint of Example 11 was obtained by repeating the same process as Example 1 except that a round rod of oxygen free copper was used as the second member (Metal B).

Example 12

A butt joint of Example 12 was obtained by repeating the same process as Example 11 except that the insert was changed from a Zn—Al alloy foil to an Zn—Al—Cu alloy foil.

Example 13

A butt joint of Example 13 was obtained by repeating the same process as Example 12 except that the second member (Metal B) did not have the fine uneven structure but had a mirror-finished joining face, and the pressure applied in the joining step was changed to 25 MPa.

Example 14

A butt joint of Example 14 was obtained by repeating the same process as Example 11 except that a round rod of pure copper with a silver-plated end face was used as the first member (Metal A).

Example 15

A butt joint of Example 15 was obtained by repeating the same process as Example 14 except that the insert was changed from a Zn—Al alloy foil to a Zn—Al—Cu alloy foil.

Example 16

A butt joint of Example 16 was obtained by repeating the same process as Example 14 except that the insert was changed to a Zn—Al—Ag alloy foil.

Example 17

A butt joint of Example 17 was obtained by repeating the same process as Example 14 except that a round rod of pure copper with a gold-plated end face was used as the first member (Metal A).

Example 18

A butt joint of Example 18 was obtained by repeating the same process as Example 17 except that the insert was changed from a Zn—Al alloy foil to a Zn—Al—Mg alloy foil, and the joining temperature was changed to 400° C.

Example 19

A butt joint of Example 19 was obtained by repeating the same process as Example 17 except that the insert was changed from a Zn—Al alloy foil to a Zn—Al—Cu alloy foil.

Example 20

A butt joint of Example 20 was obtained by repeating the same process as Example 14 except that a round rod of oxygen free copper with a silver-plated end face was used as the second member (Metal B).

Example 21

A butt joint of Example 21 was obtained by repeating the same process as Example 20 except that the insert was changed from a Zn—Al alloy foil to a Zn—Al—Ag alloy foil.

Example 22

A butt joint of Example 22 was obtained by repeating the same process as Example 20 except that a round rod of pure copper with a gold-plated end face was used as the first member (Metal A).

Example 23

A butt joint of Example 23 was obtained by repeating the same process as Example 22 except that the insert was changed from a Zn—Al alloy foil to a Zn—Al—Mg alloy foil, and the joining temperature was changed to 400° C.

Example 24

A butt joint of Example 24 was obtained by repeating the same process as Example 22 except that the insert was changed from a Zn—Al alloy foil to a Zn—Al—Ag alloy foil.

Comparative Example 1

A first member (Metal A) of pure copper was joined to a second member (Metal B) of aluminum alloy in the same conditions as Example 1 in which the second member did not have the fine uneven structure, and no insert was interposed between them.

Comparative Example 2

To join a first member (Metal A) of a pure copper round rod with a silver-plated end face to a second member (Metal B) of oxygen free copper round rod with a silver-plated end face, a Sn—Ag—Cu solder was interposed between the joining faces and they are heated at 260° C. for 5 minutes so that the members are brazed to each other.

TABLE 1

| Type | Members to be Joined | | | Insert | | Joining Conditions | | | Joining Strength Determination |
|---|---|---|---|---|---|---|---|---|---|
| | First Metal A | Second Metal B | Fine Uneven Structure | Composition Type | Thickness(μm) | Applied Pressure(MPa) | Temperature(° C.) | Time(min) | |
| Example 1 | Cu | Al | Provided | Zn—Al | 100 | 10 | 420 | 1 | A |
| Example 2 | Cu | Al | Provided | Zn—Al—Cu | 100 | 2 | 420 | 1 | A |
| Example 3 | Cu | Al | Provided | Zn—Al—Cu | 100 | 20 | 420 | 1 | A |
| Example 4 | Cu | Al | Not Provided | Zn—Al—Cu | 100 | 25 | 420 | 1 | A |
| Example 5 | Cu | Al | Provided | Zn—Al—Cu | 300 | 10 | 420 | 1 | B |
| Example 6 | Cu | Al | Provided | Zn—Al—Cu | 20 | 10 | 420 | 1 | A |
| Example 7 | Ag | Al | Provided | Zn—Al | 100 | 10 | 420 | 1 | A |
| Example 8 | Ag | Al | Provided | Zn—Al—Ag | 100 | 10 | 420 | 1 | A |
| Example 9 | Au | Al | Provided | Zn—Al | 100 | 10 | 420 | 1 | A |
| Example 10 | Au | Al | Provided | Zn—Al—Mg | 100 | 10 | 400 | 1 | A |
| Example 11 | Cu | Cu | Provided | Zn—Al | 100 | 10 | 420 | 1 | A |
| Example 12 | Cu | Cu | Provided | Zn—Al—Cu | 100 | 10 | 420 | 1 | A |
| Example 13 | Cu | Cu | Not Provided | Zn—Al—Cu | 100 | 25 | 420 | 1 | A |
| Example 14 | Ag | Cu | Provided | Zn—Al | 100 | 10 | 420 | 1 | A |
| Example 15 | Ag | Cu | Provided | Zn—Al—Cu | 100 | 10 | 420 | 1 | A |
| Example 16 | Ag | Cu | Provided | Zn—Al—Ag | 100 | 10 | 420 | 1 | A |
| Example 17 | Au | Cu | Provided | Zn—Al | 100 | 10 | 420 | 1 | A |
| Example 18 | Au | Cu | Provided | Zn—Al—Mg | 100 | 10 | 400 | 1 | A |
| Example 19 | Au | Cu | Provided | Zn—Al—Cu | 100 | 10 | 420 | 1 | A |
| Example 20 | Ag | Ag | Provided | Zn—Al | 100 | 10 | 420 | 1 | A |
| Example 21 | Ag | Ag | Provided | Zn—Al—Ag | 100 | 10 | 420 | 1 | A |
| Example 22 | Au | Ag | Provided | Zn—Al | 100 | 10 | 420 | 1 | A |
| Example 23 | Au | Ag | Provided | Zn—Al—Mg | 100 | 10 | 400 | 1 | A |
| Example 24 | Au | Ag | Provided | Zn—Al—Ag | 100 | 10 | 420 | 1 | A |
| Comparative Example 1 | Cu | Al | Not Provided | None | — | 10 | 420 | 1 | C |
| Comparative Example 2 | Ag | Ag | Not Provided | Solder | — | — | 260 | 5 | Reference |

As is clear from table 1, Comparative Example 1, in which no insert was used for the joining, was not substantially joined. In contrast, it was found that a robust joining can be formed in Examples 1 to 24 by interposing an insert containing Zn between the two members so that the insert causes an eutectic reaction with both of Metal A and Metal B.

In the examples, the joining strength tends to decrease when the joining temperature is high and the applied pressure is low or when the insert is excessively thick compared to the surface roughness of the joining faces.

Figure 4:
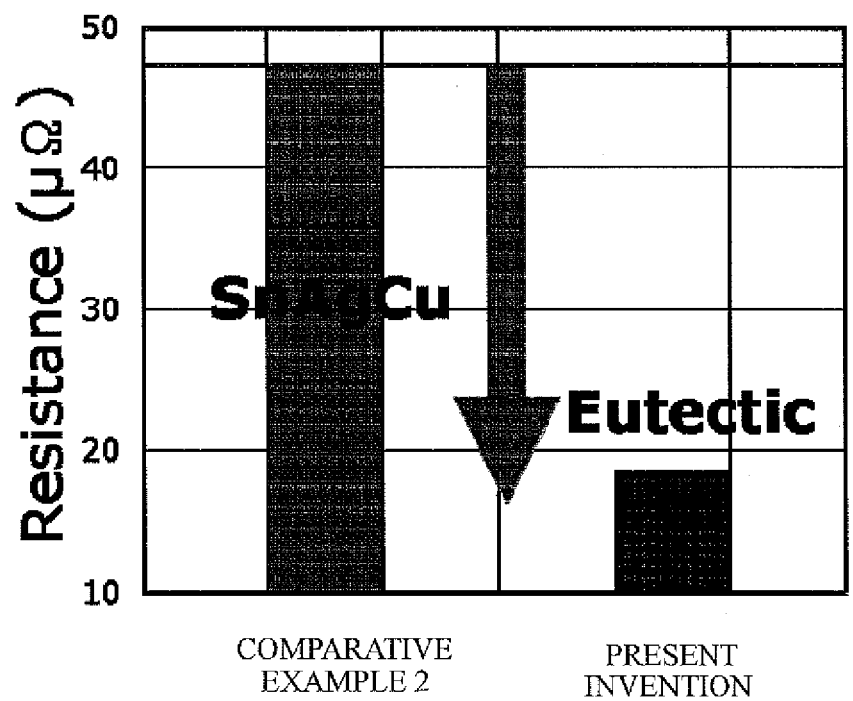
FIG. 4 is a graph illustrating the electrical resistance of a joining interface formed by the method for joining metal materials of the present invention compared to that by a conventional method.

FIG. 4 illustrates the electrical resistances at the joining interfaces of the butt joints of Example 20 and Comparative Example 2. It was confirmed that the electrical resistance can be greatly decreased with the present invention compared to the conventional Sn—Ag—Cu solder. Further, the heat resistance can be also decreased. That is, it was confirmed that the present invention is suitable for joining semiconductor devices or electronic parts.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

REFERENCE SIGNS LIST 1 first member (Metal A)
1f oxide film
1r fine uneven structure
2 second member (Metal B)
2f oxide film
3 insert
4 discharge

The invention claimed is:

1. A method for joining metal materials, which joins a first member with at least a joining face made of Metal A, the Metal A being mainly composed of at least one selected from the group consisting of Al, Cu, Ag and Au, to a second member with at least a joining face made of Metal B, the Metal B being mainly composed of at least one selected from the group consisting of Al, Cu, Ag and Au, except for when Metal A and Metal B are both composed mainly of either Al or Au, comprising:

interposing an insert between the joining faces of the first and second members, wherein the insert contains Zn as a metal capable of causing an eutectic reaction with at least one metal except for Au in the Metal A as well as at least one metal except for Au in the Metal B; and joining the first and second members to each other by heating the first and second members to a temperature causing the eutectic reaction within a range from a melting point of the insert to the melting point+100° C. while applying an opposing pressure to the first and second members, so that an eutectic melt is produced at an joining interface between the first and second members, and an oxide film formed on a surface of the Metal A and/or the Metal B is discharged from the joining interface along with the eutectic melt.

2. The joining method according to claim 1, wherein the insert is a metal that is mainly composed of Zn.

3. The joining method according to claim 1, wherein the insert is an alloy that is mainly composed of Zn and at least one metal selected from the group consisting of Al, Mg, Cu, Ag and Sn.

4. The joining method according to claim 3, wherein the insert is an alloy that contains Zn and Al.

5. The joining method according to claim 3, wherein the insert is an alloy that contains Zn, Al and Mg.

6. The joining method according to claim 1, wherein the Metal A and the Metal B are made of homogeneous materials.

7. The joining method according to claim 1, wherein a thickness of the insert is from 20 to 200 μm.

8. The joining method according to claim 1, further comprising: forming a fine uneven structure on at least a part of the joining faces and a surface of the insert.

9. The joining method according to claim 2, wherein the Metal A and the Metal B are made of homogeneous materials.

10. The joining method according to claim 3, wherein the Metal A and the Metal B are made of homogeneous materials.

11. The joining method according to claim 4, wherein the Metal A and the Metal B are made of homogeneous materials.

12. The joining method according to claim 5, wherein the Metal A and the Metal B are made of homogeneous materials.

13. The joining method according to claim 2, wherein a thickness of the insert is from 20 to 200 μm.

14. The joining method according to claim 3, wherein a thickness of the insert is from 20 to 200 μm.

15. The joining method according to claim 4, wherein a thickness of the insert is from 20 to 200 μm.

16. The joining method according to claim 5, wherein a thickness of the insert is from 20 to 200 μm.

17. The joining method according to claim 6, wherein a thickness of the insert is from 20 to 200 μm.

18. The joining method according to claim 2, further comprising: forming a fine uneven structure on at least a part of the joining faces and a surface of the insert.

19. The joining method according to claim 3, further comprising: forming a fine uneven structure on at least a part of the joining faces and a surface of the insert.

20. The joining method according to claim 4, further comprising: forming a fine uneven structure on at least a part of the joining faces and a surface of the insert.

* * * * *